Feb. 14, 1961  J. A. CHILMAN ET AL  2,972,087
PHASING APPARATUS
Filed Oct. 13, 1958  11 Sheets-Sheet 9

J. A. CHILMAN ET AL 2,972,087

PHASING APPARATUS

Filed Oct. 13, 1958

United States Patent Office 2,972,087
Patented Feb. 14, 1961

2,972,087

PHASING APPARATUS

John Alfred Chilman, Alfred George Mapp, John Michael Masterman, and John Cripps, all of Gloucester, England, assignors to Rotol Limited, Gloucester, England, a British company Filed Oct. 13, 1958, Ser. No. 766,847

Claims priority, application Great Britain Oct. 14, 1957

12 Claims. (Cl. 317—6)

The invention relates to phasing apparatus for use with speed equalising apparatus for mechanically independent power conversion units or other rotary members and for convenience will be described with reference to the engine-propeller units of a multi-engined aircraft.

An object of the invention, as applied to engine-propeller units, is to provide improved phasing apparatus whereby any desired number of engine-propeller units may be brought into a desired phase relation with one another after the speeds of the units have been equalised. By "a desired phase relation" is meant a predetermined angular relationship between a blade of any one propeller of the aircraft and a blade of any other propeller of the aircraft. For example, it may be required that all the propellers, after their speeds have been equalised, be brought into a phase relationship such that when a blade of one propeller is in an upright position with respect to the aircraft, a blade of each of the other propellers is also in an upright position, or alternatively, at a predetermined angle to the upright, depending upon the results desired, such as, for example, the elimination of vibration in the running of the units.

The invention provides phasing apparatus for correcting error in the difference in phase between a master rotary member and a slave rotary member, comprising means for producing a pulse (master pulse) of electrical energy each time the master rotary member occupies one or more predetermined angular positions (master positions), means for producing a pulse (slave pulse) of electrical energy each time the slave rotary member occupies one or more predetermined angular positions (slave positions), there being a slave position corresponding to the or each master position, means for comparing the succession of slave pulses with the succession of master pulses and producing an electrical phase difference error correcting signal which is directly proportional in magnitude, and corresponds in sense, to any error in the said phase difference, and means, responsive to the said signal, for adjusting the said difference in phase to reduce the said error.

The invention also provides phasing apparatus for correcting error in the difference in phase between a master rotary member and a slave rotary member, comprising means for producing a master pulse of electrical energy each time the master rotary member occupies one or more predetermined angular positions (master positions), means for producing a slave pulse of electrical energy each time the slave rotary member occupies one or more predetermined angular positions (slave positions), there being a slave position corresponding to the or each master position, and means for comparing the succession of slave pulses with the succession of master pulses and producing an electrical phase difference error correcting signal, which is directly proportional in magnitude, and corresponds in sense, to any error in the said phase difference, which means for comparing the succession of slave pulses with the succession of master pulses and producing the said signal comprise an electronic device having two alternative, stable states, which electronic device is changed from one state to the other and back again alternately by the master and slave pulses and provides an output which is proportional in magnitude, and corresponds in sense, to the said error.

When the slave rotary member is the rotary part of an engine-propeller unit of a multi-engined aircraft the master rotary member may be provided by one of the other engine-propeller units, and in this case it is preferably arranged that the phase difference error signal is reduced to zero when the slave member and the master member, after they have been equalised in speed, have been brought into the desired phase relation with one another.

Alternatively however the master rotary member may be the rotary part of a rotary machine other than an engine-propeller unit, and in this case it is preferably arranged that each engine-propeller unit, after it has been equalised in speed with the master, is brought into a predetermined phase relation with the master such that the units are then in the desired phase relation with one another.

It is preferred that the said means responsive to the said signal include an electromagnetic amplifier, a reversible, two-phase A.C. motor, and means for adjusting the speed of the slave rotary member, which electromagnetic amplifier supplies to the said motor an alternating current, of a magnitude corresponding to the magnitude of the said error, to cause the motor to run at a speed corresponding to the sense of the said error, the motion of which motor is applied to the means for adjusting the speed of the slave rotary member.

Preferably the means for adjusting the speed of the slave rotary member comprise a worm gear mounted on the output shaft of the said A.C. motor, which worm gear meshes with a pinion on which is eccentrically pivoted a link, one end of which is operably connected to a manual control and the other end of which is operably connected to a throttle valve controlling an engine driving the slave rotary member, and to the datum control of a constant speed unit for the slave rotary member. Preferably means are provided for producing a rate of change of phase difference error signal which is connected to assist in reducing the phase difference error.

Means may be provided for producing a rate of change of rate of change of phase difference error signal which is connected to assist in reducing the phase difference error.

It is also preferred that the slave rotary member is the rotary part of an engine propeller unit.

It is still further preferred that the master rotary member is the rotary part of an engine propeller unit.

Phasing apparatus according to the present invention is preferably employed in conjunction with speed equalising apparatus of the kind comprising means for producing an alternating electric current speed-reference-signal, means operated by said rotary power conversion unit for producing an alternating electric current speed-signal the frequency of which is related to the speed of the unit, a reversible motor or dynamo-electric machine connected to be energized by said alternating current signals, said machine having a rotor which rotates at a speed which is proportional in magnitude and corresponding in direction to the difference between the frequencies of said energising signals, and speed adjusting means controlled by rotation of said rotor for adjusting the speed of said rotary power conversion unit in a sense and to an extent to reduce said frequency difference to zero.

When applied to the control of an engine-propeller unit of a multi-engined aircraft, in conjunction with phasing apparatus according to the present invention, said speed adjusting means controlled by rotation of said rotor also preferably comprises differential means for trimming said main speed control linkage.

By using speed synchronising apparatus of the aforesaid kind to trim the main speed control linkage in order to make the speed of the engine-propeller unit the same as the speed of the master, a steady phase difference may be obtained, but at no predetermined phase relationship. The rate at which the speed equalising apparatus trims the main speed control linkage may however be adjusted to achieve, as nearly as possible, the required accuracy of phase difference, the phasing apparatus according to the invention then trimming the main speed control linkage until the desired phase relation is obtained.

Due to the high gain which is required from a system as just defined in order to achieve the desired accuracy, a degree of hunting is to be expected, and to overcome this there may be provided in addition means for producing a rate of change of phase difference error signal. The rate of change of phase difference error signal may be fed into the apparatus to supplement the phase difference error signal or, alternatively, or in addition, the rate of change of phase error signal may be fed to a differential device controlling the phase difference adjusting means.

The rate of change of phase difference error signal may be obtained by differentiating the phase difference error signal with respect to time and a conventional differentiating circuit may be employed for that purpose. However, the rate of change of phase difference is equivalent to the rate of relative rotation of the said two rotary members and is also equivalent to the rate of rotation of the said A.C. motor, as the rate of rotation of a member is equivalent to the rate of change of its angular position. Consequently the rate of change of phase difference error signal may alternatively be obtained from the difference in the outputs of two tacho-generators driven respectively by or at the same speeds as, the said two rotary members respectively, or may, as a further alternative, be obtained from the output of a tacho-generator driven by the said A.C. motor.

A specific construction of apparatus embodying the invention will now be described, together with modifications of the apparatus, by way of example and with reference to the accompanying drawings in which:

Figure 10 shows a detail of the arrangement of Figure 9, and Figures 11a and 11b are a circuit diagram of the electronic parts of the block diagram shown in Figure 8 and also shows, in detail, the parts omitted from Figure 3.

The specific construction and modifications which are about to be described show the application of the invention to a single slave engine-propeller unit of a two-engined aircraft to equalise the speeds of the slave unit and the other, master, engine-propeller unit and then to bring the slave unit into a desired phase relation with the master unit.

The apparatus which equalises the speeds of the master and slave propeller units comprises an electric motor or dynamo-electric machine 60 of the kind described in British specification No. 515,934. In this motor there are two stator windings one of which is supplied with current (the speed reference signal) from an alternator driven by the master engine-propeller unit and the other of which is supplied with current (the speed signal) from an alternator driven by the slave engine-propeller unit. In the motor 60 one winding generates a rotating field the frequency of which corresponds to the speed of the master engine and the other winding generates a field, rotating in the opposite sense, the frequency of which corresponds to the speed of the slave engine. The rotor shaft of the motor 60 carries two rotor elements the windings on which are so arranged that an oscillating electro magnetic flux common to both windings causes the rotor shaft to take-up a position in which the magnetic reluctance is a minimum. In taking up this position the rotor will rotate at a speed corresponding to half the algebraic sum of the speeds of rotation of the two rotating stator fields. The rotor of the motor 60 drives a worm gear which meshes with a pinion 61 which carries eccentrically a pivoted differential lever 51 which is in turn connected to the main speed control linkage 50 of the slave engine. Rotation of the pinion by the motor 60 causes the lever 51 to trim the main speed control linkage 50 to alter the speed of the slave engine and make it equal to that of the master engine after which the motor 60 ceases to operate.

The slave unit is provided with an electromagnetic pulse unit indicated diagrammatically at 10 and a corresponding unit 11 is provided on the master unit. Each unit 10, 11 comprises an electromagnet 12, having a U-shaped laminated core conveniently mounted on the stationary slip-ring 70 of the de-icing gear assembly 71 of a four-bladed, variable-pitch propeller 72, and two small armatues 13, there being an armature 13 for each alternate blade of the propeller 72. The armatures 13 rotate with the propeller 72 past the fixed electromagnet 12 each time an armature 13 bridges the poles of the electromagnet 12. The armatures 13 of the master pulse unit are spaced apart and so positioned in relation to the blades of the propeller of the master unit that a master pulse is generated when the propeller of the master unit occupies each of the angular master positions (i.e. each time an armature bridges the poles of the electromagnet 12 of the master unit). Since the propellers of both the slave and master units are four-bladed the master propeller will occupy an angular master position twice per revolution of the master propeller. It is arranged in this specific embodiment that each time a blade of the propeller of the master unit occupies a vertical position relative to the aircraft (when the aircraft is in straight level flight) an armature 13 bridges the poles of the electromagnet 12 of the master pulse unit so that a master pulse is generated.

The armatures 13 of the slave pulse unit are spaced apart and so positioned in relation to the blades of the propeller of the slave unit that a slave pulse is generated in the winding of the slave electro magnet when the propeller of the slave unit occupies each of the angular slave positions in which slave positions the slave propeller is in a desired phase relationship with the master propeller (i.e. a desired angular difference exists between the slave and master propellers).

Figure 8:
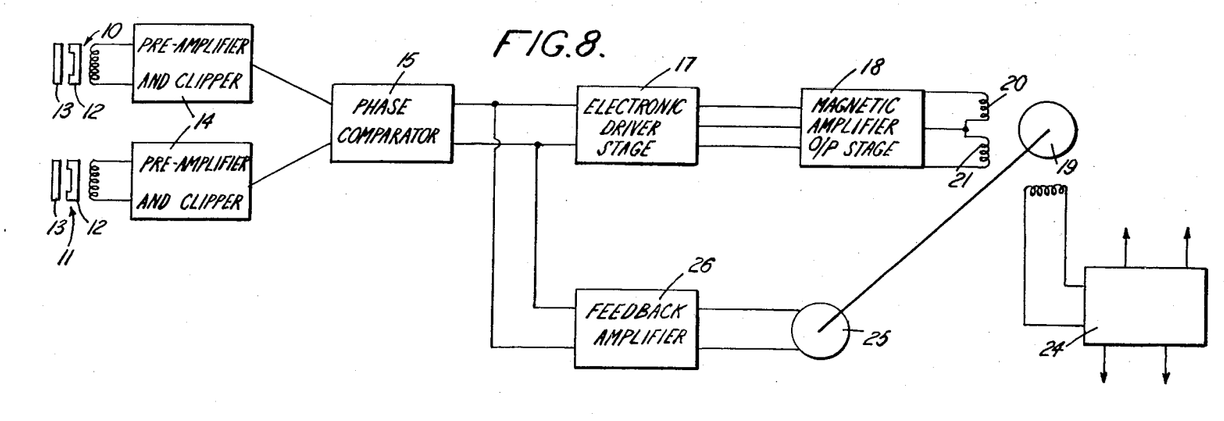
Figure 8 is a modified block diagram, showing a preferred arrangement.

Reference is now made to the block diagram shown in Figure 8.

The signal pulses from the master and slave pulse units 10, 11 are fed into an electronic circuit consisting of six stages and starting with pre-amplifier stage 14. The pre-amplifier stage 14 is designed to produce pulses of suitable size, shape and polarity from pulse units 10, 11 to operate the next stage 15 which is a phase comparator stage for the pulses and is designed to generate a signal in the form of an output voltage which is proportional in magnitude and corresponding in sense to the error in the phase difference between the master and slave pulses. This signal will, for convenience, be called the phase difference error signal and it is fed to a driver amplifier stage 17 which gives a current proportional to the phase difference error signal. The driver stage 17 is designed to give sufficient output to control a magnetic amplifier stage 18 designed to give an A.C. output of 400 c.p.s. corresponding to the A.C. supply frequency.

The magnetic amplifier feeds a reversible two phase A.C. motor 19 the output shaft 90 of which turns in one sense or the other depending on which of the windings 20, 21 is energised by the magnetic amplifier in accordance with the sense of the phase difference error signal.

Coupled to the rotor shaft of the two phase A.C. motor 19 is a feedback generator 25 which generates a D.C. voltage directly proportional in magnitude and sense, to the speed of the two phase A.C. motor. This voltage is amplified by feedback amplifier 26 and added to the phase difference error voltage signal between stages 15 and 17. In this manner the response of the two phase A.C. motor is damped, and its speed in magnitude and sense is made dependent solely upon the magnitude and sense of the phase difference error voltage. The circuit of the feedback amplifier 26 includes a phase difference control.

In order to overcome the effects of inertia and friction in the two phase motor and its gears, a second dynamoelectric machine is mounted on the same shaft as the two phase motor. This machine is constructed to give a voltage output proportional to speed both in magnitude and direction. This speed signal is fed back into the electronic control system so as to partially cancel or negative the error signal which is being fed into the electric control system, with all the advantages of improving the linearity of response which this produces. There is a further advantage in this arrangement in that the speed of response or overall gain of the system may be adjusted to the best advantage by variation in the feedback characteristic anywhere in the system 19 to 25 and 26.

A power supply unit 24 provides the necessary H.T. and L.T. supplies to the amplification and comparator stages of the electronic circuit.

Figure 11A:
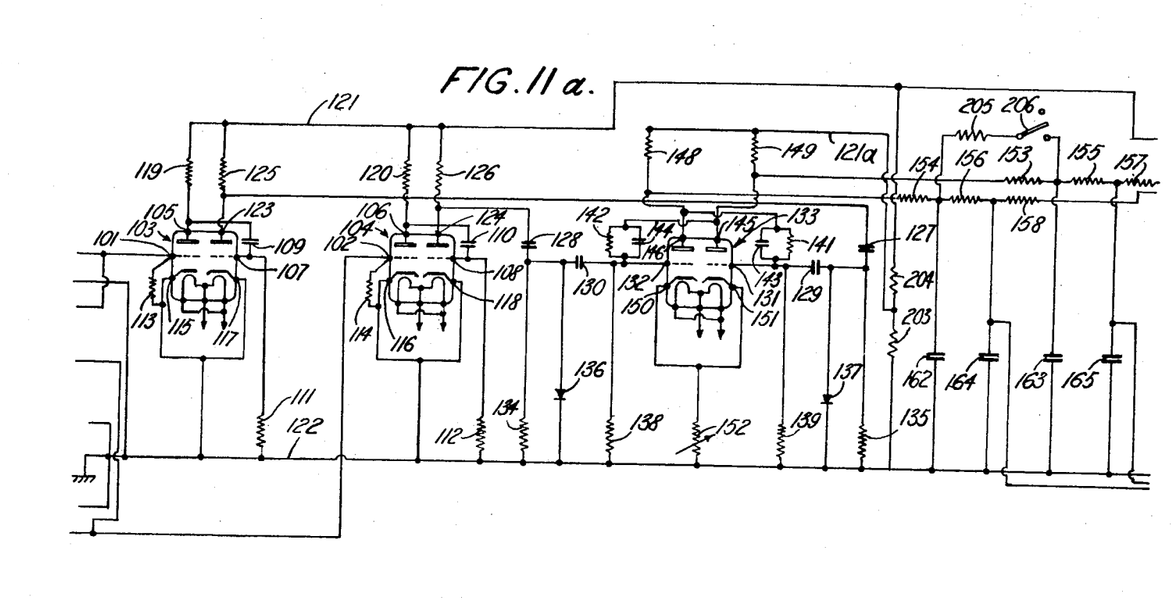
Figure 11B:
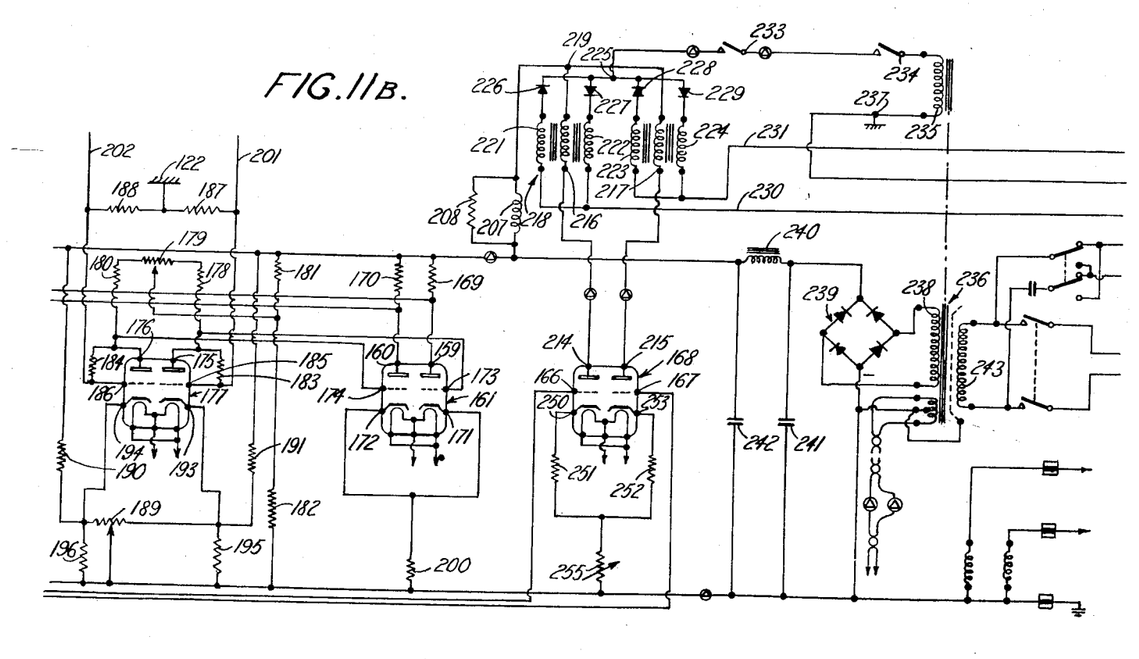

Referring now to Figures 11A and 11B of the accompanying drawings, the master and slave pulses are fed respectively to the grids 101, 102 of double triode valves 103, 104. The corresponding anodes 105, 106 of valves 103, 104 are connected respectively to the other grids 107, 108 of the valves 103, 104 via capacitors 109, 110 respectively. The grids 107, 108 are connected to an earth line 122 via resistors 111, 112 respectively. The grids 101, 102 are connected via resistors 113, 114 respectively to corresponding cathodes 115, 116 respectively. The other two cathodes 117, 118 are respectively connected to cathodes 115, 116 and to earth. The anodes 105, 106 are connected via resistors 119, 120 respectively to an H.T. line 121. The other anodes 123, 124 of the valves 103, 104 are connected via resistors 125, 126 respectively to the H.T. line 121. The valves 103, 104 constitute the pre-amplifying stage 14.

The signals from the pre-amplifier valves 103, 104 are clipped by means of clipping circuits, the signal from valve 103 being fed through capacitors 127, 129 to one grid 131 of valve 133. The signal from valve 104 is fed through capacitors 128, 130, to the other grid 132 of valve 133. Connected at the junction of the capacitors 128, 130 is a resistor 134 and a rectifier 136 connected in parallel to the earth line 122. The junction of the capacitors 127, 129 is connected via a resistor 135 and a rectifier 137 connected in parallel to the earth line 122. The grids 131, 132 of the valve 133 are connected to the earth line 122 by resistors 139, 138 respectively. The grid 131 of the valve 133 is connected, via a resistor 141 and capacitor 143 in parallel to one anode 146 of the valve 133 and the other grid 132 of the valve 133 is connected via a resistor 142 and capacitor 144 in parallel to the other anode 145 of the valve 133. The anodes 145, 146 are connected to the H.T. line 121a by resistors 149, 148 respectively. The H.T. line 121a is connected to H.T. line 121 via resistor 204 and to the earth line 122 via resistor 203. The cathodes 151, 150 corresponding to the anodes 145, 146 are commoned and connected to the earth line 122 by a preset potentiometer 152.

The signals from the anodes of valves 103, 104 are differentiated and clipped by the circuits containing capacitors 128, 130, 127, 129 and rectifiers 136 and 137. The valve 133 acts as a "flip-flop." The signals from the anodes 145, 146 of the valve 133 are added via resistors 153, 155, 157 and 154, 156, 158 respectively to the signals from the anodes 159, 160 respectively of the double triode amplifier valve 161. The junction of resistors 153 and 155 is connected to the junction of resistors 154 and 156 via a switch 206 and resistor 205 connected in series.

The junction of the resistors 153, 155 is connected to the earth line 122 via a capacitor 163. The junction of the resistors 155, 157 is connected to the earth line 122 via a capacitor 165. The junctions of the resistors 154, 156 and 156, 158 are similarly connected, via parallel capacitors 162, 164 respectively to the earth line 122.

The junction of the resistor 155 and the capacitor 165 is connected to one grid 166 of a double triode valve 168 and the junction of the resistor 156 and the capacitor 164 is connected to the other grid 167 of the valve 168.

The anodes 159, 160 of the valve 161 are connected via resistors 169, 170 respectively to the H.T. line 121. The corresponding cathodes 171, 172 respectively are commoned and their junction connected via a resistor 200 to the earth line 122. The corresponding grids 173, 174 respectively are connected to the anodes 175, 176 respectively of a double triode valve 177. The anode 175 is connected to the anode 176 via three resistors 178, 179, 180 respectively in series, the resistor 179 being a variable potentiometer the tap of which is connected to the junction of two potential divider resistors 181, 182 connected respectively to the H.T. line 121 and the earth line 122. The anodes 175, 176 are also connected via resistors 183, 184 respectively to the corresponding grids 185, 186 respectively of the valve 177. The grid 185 is connected via two resistors 187, 188 respectively in series to the grid 186, and the junction of resistors 187, 188 is connected to the earth line 122.

The cathodes 193, 194 of the valve 177 are connected via a potentiometer 189, the top of which is connected to the earth line 122. The cathodes 193, 194 are also connected to earth line 122 via resistors 195, 196 respectively and to H.T. line 121 via resistors 191, 190 respectively. The grids 185, 186 of the valve 177 are connected via connections 201, 202 respectively to the feedback generator 25.

The anodes 214, 215 of the valve 168 are connected respectively to the centre windings 216, 217 of a magnetic amplifier 218 which are commoned at a junction 219. This junction 219 is connected to the H.T. line 121 via a relay coil and a resistor 208 connected in parallel. The outer windings 221, 222 associated with the centre winding 216 and the outer windings 223, 224 associated with the centre winding 217 are connected via rectifiers 226, 227, 228 and 229 respectively to a junction 225. The windings 221, 222 are commoned and connected via a lead 230 to the phase synchronising motor 19. The windings 227, 224 are similarly commoned and connected via a lead 231 to the same motor. The junction 225 is connected via switches 233, 234 and a winding 235 of a transformer 236 to earth at 237. The transformer 236 has another winding 238 connected via a rectifier bridge 239 and a choke 240 to the H.T. line 121. Capacitors 241, 242 connect the ends of the choke 240 to the earth line 122. A winding 243 of the transformer 238 supplies a constant 400 cps. signal. One cathode 250 of the valve 168 is connected via two resistors 251, 252 in series to the cathode 253. The junction of the resistors 251, 252 is connected via a variable resistor 255 to the earth line 122.

Figure 4:
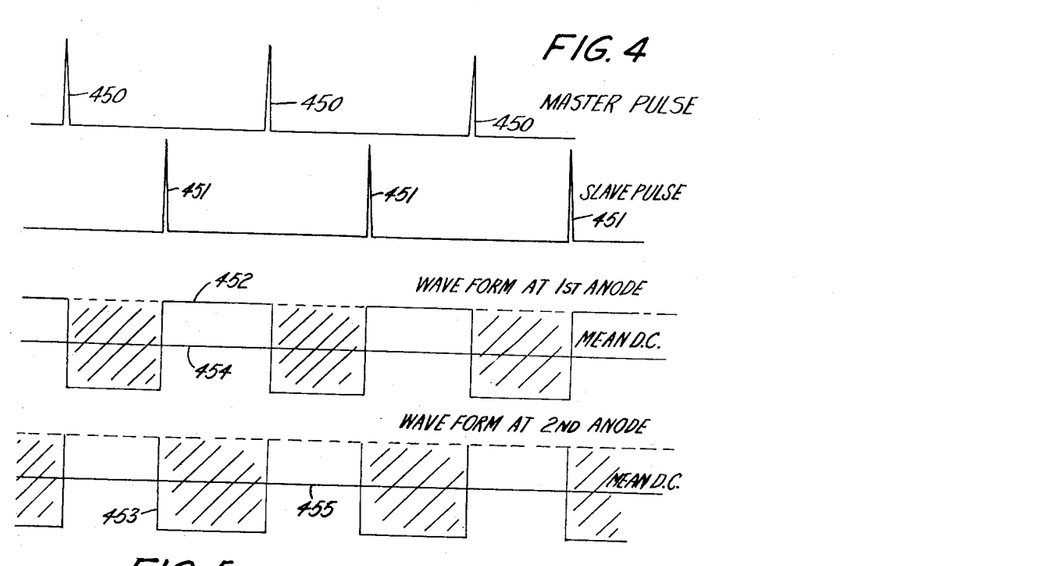
Figure 5:
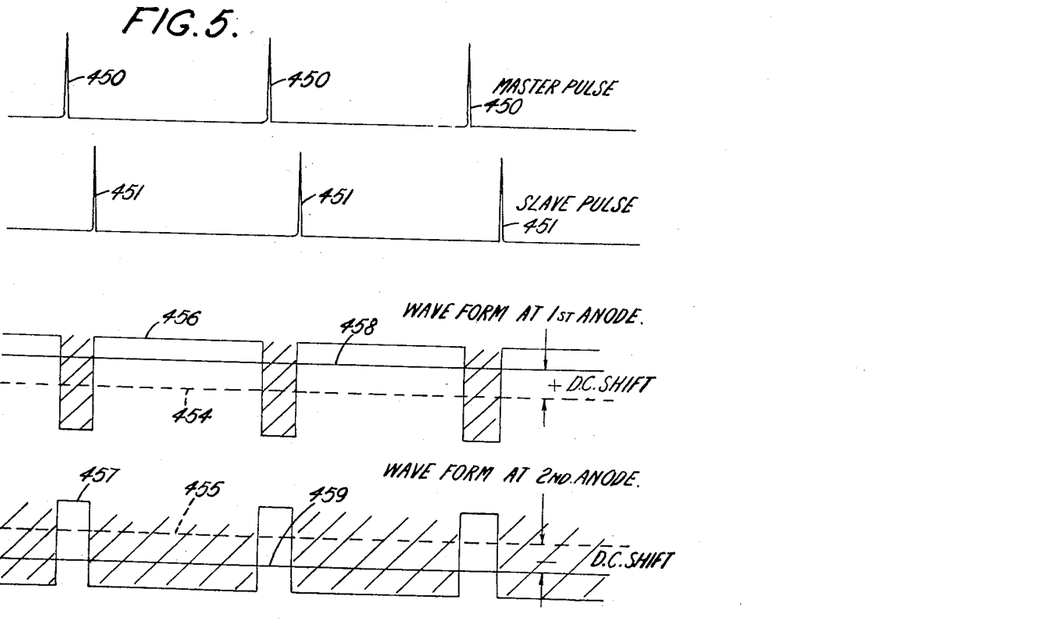

The operation of the circuit is as follows. Pulses 450 and 451 from the master and slave pulse units respectively are generated as already explained and shown in Figure 4 and are pre-amplified by valves 103 and 104 respectively. The "flip-flop" valve 133 produces signals from its anodes 145, 146 respectively which are of a duration depending on the difference in phase of the master and slave pulses i.e. current flows to the anode 145 when a master pulse reaches the grid 131 and continues to flow until a slave pulse reaches the grid 132 when current ceases to flow to the anode 145 and instead flows to the anode 146. Assuming that the master and slave pulses 450 and 451 occur at a constant common frequency and there is a phase difference between them of 180°, as shown in Figure 4, then the signals 452 and 453 at the anodes 145, 146 respectively will be as shown in Figure 4 and will have the mean D.C. levels 454 and 455 respectively which are the same. If there is an error in the phase difference between the pulses 450 and 451, as shown in Figure 5, then the corresponding outputs 456 and 457 respectively from the anodes of the "flip-flop" are as shown in Figure 5 and the mean D.C. levels 458 and 459 respectively of these outputs are different.

The outputs 456 and 457 from the anodes of the valve 133 are smoothed by the smoothing circuits containing resistors 154, 156 and capacitors 162, 164 and resistors 153, 155 and capacitors 163, 165. These smoothed outputs are fed to the grids of the double triode valve 168 which forms a control output stage. The valve 168 gives output currents which are sufficient to operate the magnetic amplifier 218 which in turn supplies current to the phase synchronising motor.

The feedback generator 25 driven by the phase synchronising motor provides a feedback voltage signal which depends in magnitude and sense on the speed and sense respectively of rotation of the phase synchronising motor. This feedback voltage signal is amplified by double triode valves 177 and 161. The outputs from the anodes 159, 160 of the valve 161 are added via resistors 157, 158 respectively to the smoothed outputs from anodes 145, 146 respectively of the "flip-flop" valve 133. The combined outputs from valves 133 and 161 are fed to the grids of valve 168.

The valve 177 incorporates a phase shift control in the form of the potentiometer 189 which can be varied to alter the voltages of the cathodes and hence the grids of the valve 177. The grid voltages are thus partly supplied by the signals from the tacho-generators and partly by voltages derived from the H.T. line 121 through the potential dividers formed by the resistors 190 with 189, 196 and 191 with 189, 195.

The valve 168 amplifies the combined signals from the feedback generator and and pulse units and feeds them to the magnetic amplifier 218. The magnetic amplifier supplies one or other of the operating windings of the phasing motor depending on which anode of the valve 168 is supplying current. The current from the magnetic amplifier has a frequency of 400 c.p.s. and the voltage from the magnetic amplifier depends on the signals received by the valve 168.

Figure 1:
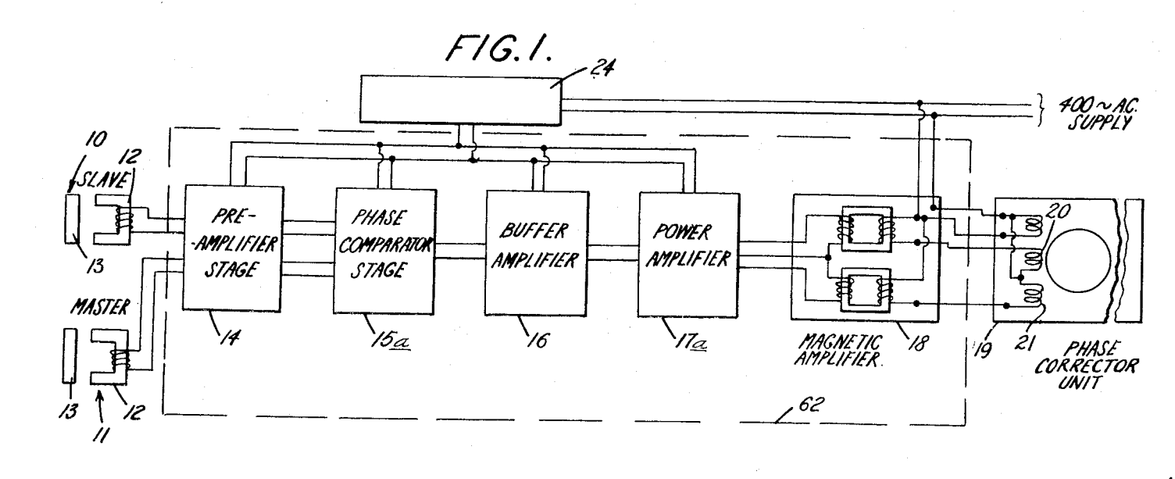
Figure 1 is a block diagram representing part of the apparatus.
Figure 3:
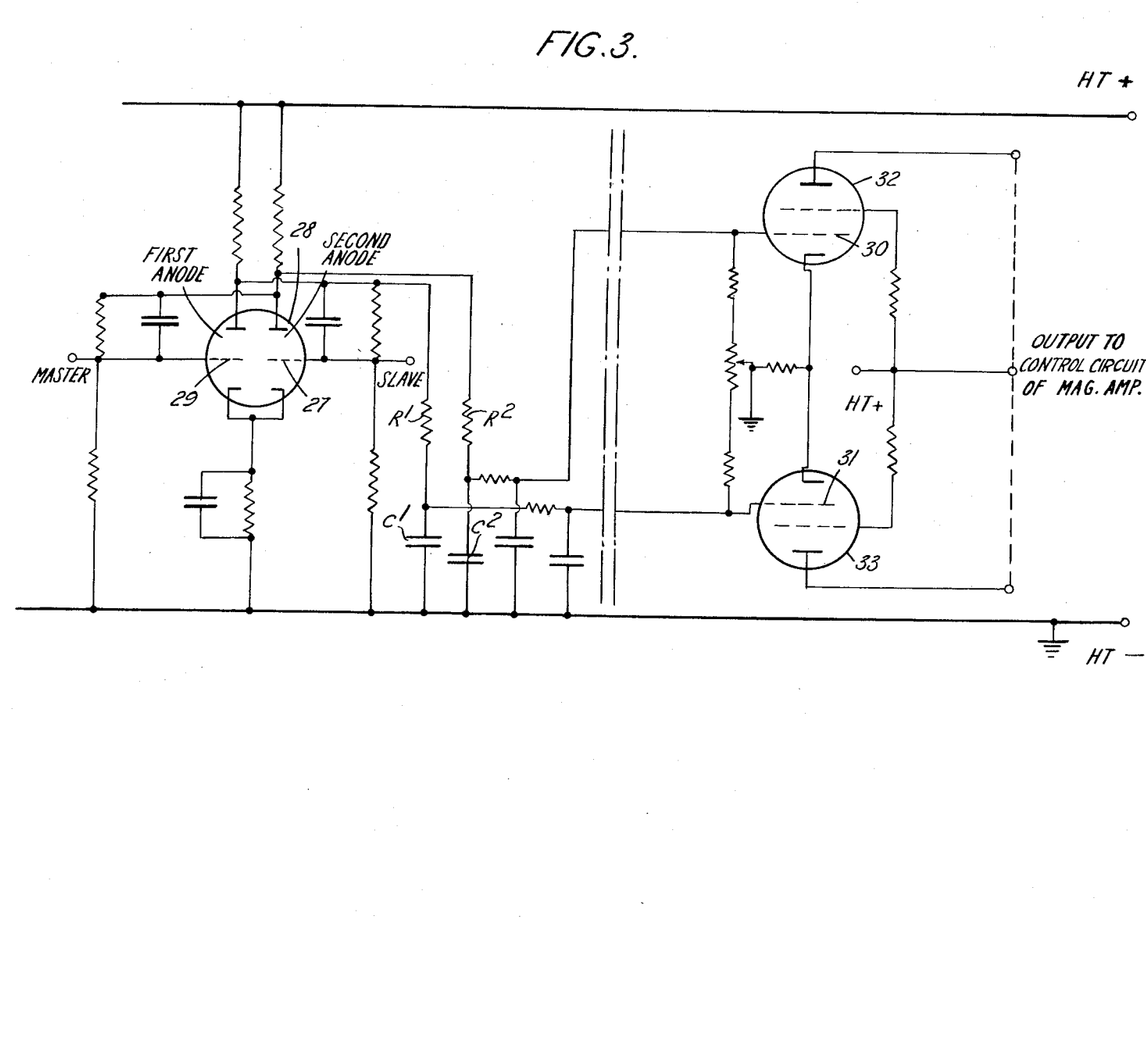
Figure 3 is a circuit diagram of certain of the stages of Figure 1, Figures 4 and 5 are further explanatory diagrams.

In the arrangement shown in Figures 1 and 3, which is a modification of that shown in Figure 8, a buffer amplifier 16 is interposed between the phase comparator stage 15a and the power amplifier or electronic driver stage 17a. The phase comparator stage 15a comprises a double-triode 28 connected as a flip-flop and having the pre-amplified master and slave pulses fed respectively to its control grids 29 and 27. The outputs at the anodes of the flip-flop are as shown in Figures 4 and 5. Those outputs are each integrated by R—c filters, $R^1$—$c^1$ and $R^2$—$c^2$, and smoothed to extract the D.C. components, and these are fed to the grids 30, 31 of two output valves 32, 33 of the power amplifier 17a.

Figure 2:
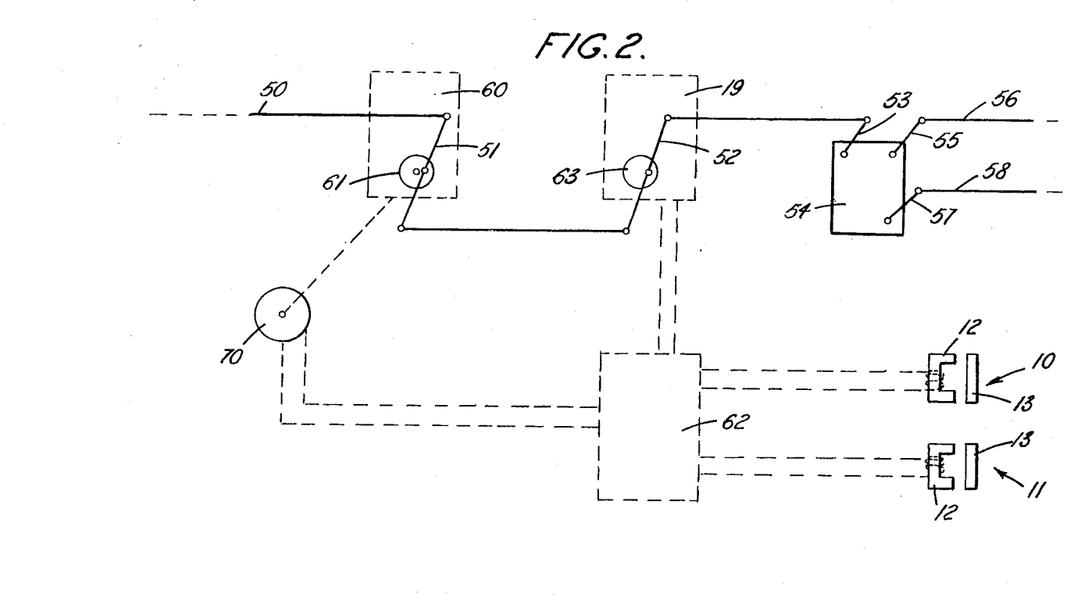
Figure 2 shows, in diagrammatic form, the application of the apparatus of Figure 1 in conjunction with speed equalising apparatus of the kind hereinbefore described, to the control of an engine-propeller unit of a multi-engined aircraft, the unit comprising an hydraulic variable pitch propeller including a variable datum constant speed unit connected for adjustment of its datum through a correlating interconnection box with a main speed control linkage actuable by means of a pilot's control, the interconnection box also transmitting movements of said main speed control linkage to the fuel valve or throttle of the engine of the unit.
Figure 6:
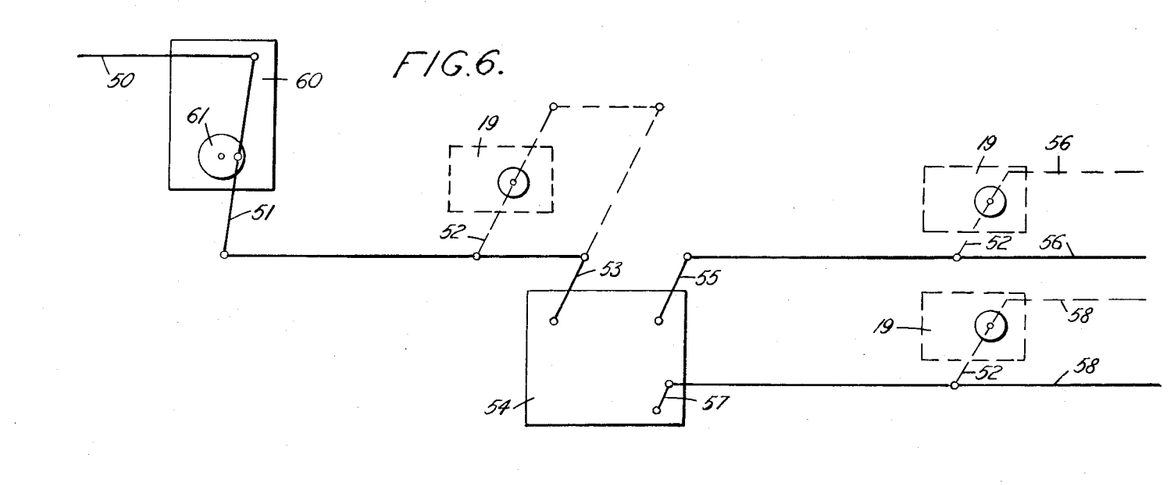
Figure 6 shows alternative arrangements of the details shown in Figure 2.

The phase synchronizing motor drives a worm gear which meshes with a pinion 63 upon which is eccentrically mounted a pivot carrying a differential lever 52 as shown in Figure 2 of the drawings accompanying this specification. Figure 6 of the accompanying drawings also shows this arrangement and some alternative arrangements. The differential lever 52 is connected to the input lever 53 of a correlating interconnection box 54. The box 54 has an output lever 55 connected by a control linkage 56 to the fuel valve of the slave propeller unit. Thus the slave propeller unit is brought into the required phase relationship with the master propeller unit by the action of the circuit and the phasing motor just described, the phasing motor operating to accelerate or retard the slave propeller unit just sufficiently to bring the slave propeller unit into the required phase relationship with the master propeller unit. The phase shift control 189 can be used to cause the slave propeller unit to come into any desired phase relationship with the master propeller unit (a relationship which may be zero phase difference or any other value of phase difference).

Once the units have been equalised in speed, only a very small temporary change in speed of the slave unit is required to bring the units into the desired phase relation, and the trimming movements effected by the motor 19 are consequently also very small and if these movements are insufficient to bring about any change in propeller pitch of the slave unit, the speed change will be effected by adjustment of the fuel valve setting alone.

With a speed equalising system of the kind described, if it could be arranged that the speed-adjusting means always returned to one particular setting for the speed "equalised" condition, and if it were so controlled by the rotor of the motor 60 that said setting had the desired phase relation with the rotor, the phase relation of the master and slave units at which speed equality would be attained would be the desired phase relation because the rotor of the dynamo-electric machine could cease to rotate only at the angular position which corresponded to the "equalised" setting of the speed adjusting means.

In practice, however, it is not possible to obtain this result with the engine propeller units of a multi-engined aircraft because the speed adjusting means must provide for variations of the master speed, and consequently of the slave speed, as well as equalising at any such speeds.

The error due to variation in the "equalised" setting of the speed adjusting means can be reduced by increasing the size of the adjustment imparted to the speed adjusting means for a single rotation of the rotor of the dynamo electric machine. A limit to this is set, however, by a further consideration.

In all equalising devices it is desirable that the rate of change of speed of the slave unit should be reduced as it approaches the speed of the master unit in order to prevent hunting.

In the system described with reference to Figure 2, the rotor of the speed equalising motor 60 is connected to adjust the differential lever 51 at a rate which achieves as nearly as possible the required accuracy of phase synchronising whilst maintaining the tendency of the system to hunt only within acceptable limits, so that the trimming required to the main speed control linkage by the phase corrector motor 19 to achieve the desired phase relation is as small as possible, or at least small enough for the trimming movements not to effect the constant speed unit datum.

It is the purpose of the differentiated signals obtained from the tacho-generators or other means as hereinbefore referred to by means of the valve 177 to keep any hunting of the system within acceptable limits so that the trimming action of the phase correcting motor 19 is as small as possible, or at least small enough for the trimming action not to affect the constant speed datum.

Figure 9:
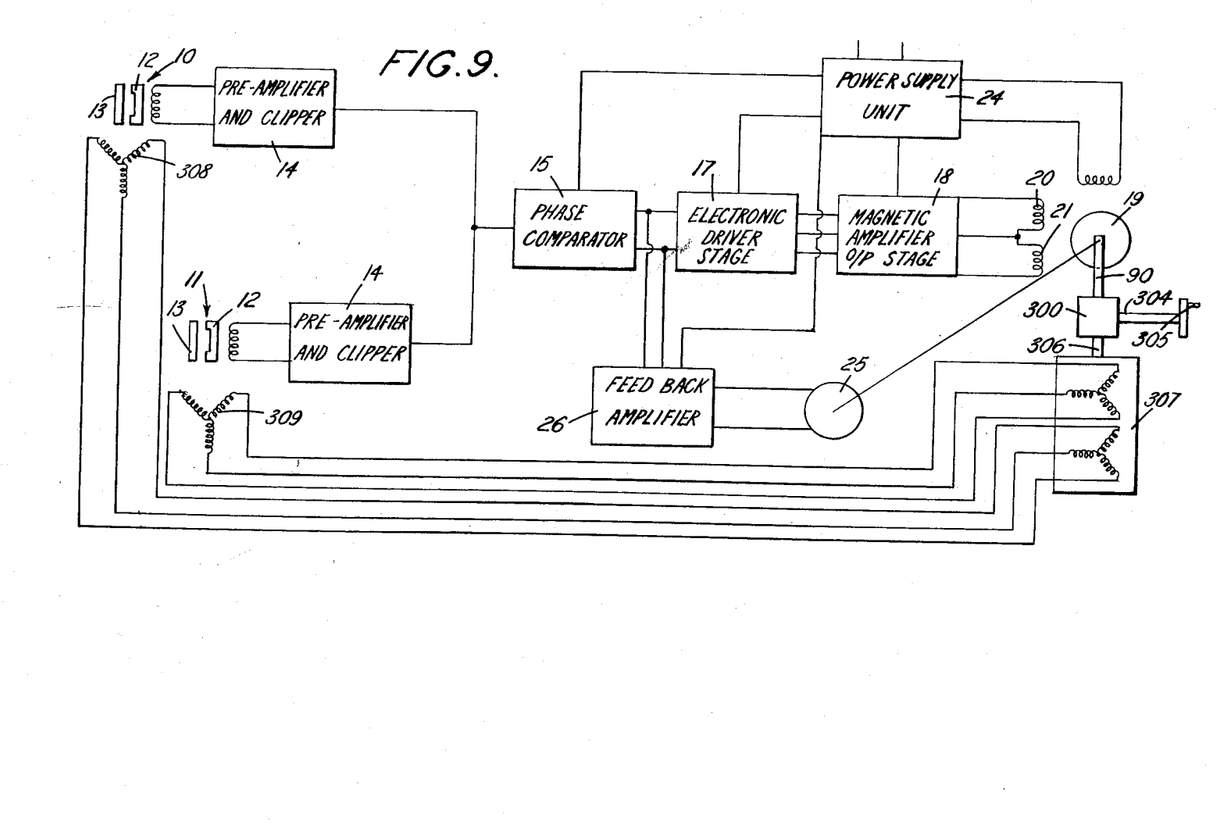
Figure 9 is a further modified block diagram of a preferred arrangement.
Figure 10:
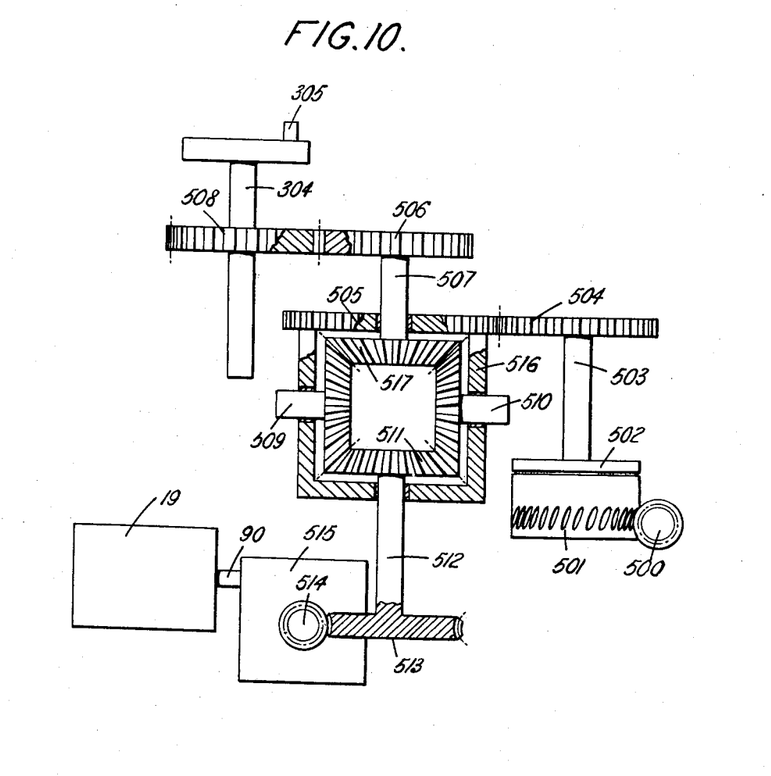

In an alternative embodiment of the invention shown in Figures 9 and 10 (Figure 10 being a schematic diagram of gear box 300 of Figure 9), the output shaft 90 of the phase correcting motor 19 drives an epicyclic gear 515 which drives the worm 514. Worm 514 meshes with gear 513 which drives gear 511 through shaft 512. Gear 511 drives gears 509, 510 which in turn drive gear 517. Gear 517 drives gear 506 through shaft 507. Gear 506 meshes with gear 508 which drives output shaft 304.

Gears 509, 510 are also driven by rotation of differential cage 516 which is attached to gear 505. Gear 505 is driven by gear 504 which in turn is driven by gear 501 through clutch 502 and output shaft 503. The clutch 502 slips when the output shaft 304 reaches a limit of travel if either the input shaft 500 or 514 continues to rotate. Gear 501 is driven by worm 500 which is attached to output shaft 306 of speed equalising motor 307, which is provided with two opposing windings.

Signals from windings 308, 309 (see Figure 9) on the speed correcting alternators are fed to the windings of the motor 307. Thus when the slave engine is running at the same speed as the master engine, the signals fed from the alternators to the motor 307 are equal and opposite and the shaft 306 of the motor 307 is not subject to any turning effect. Thus when the slave engine and the master engine are running at the same speeds and phase, the phase correcting motor 19 and the speed correcting motor 307 are stationary. If the slave engine then runs at a speed different from the master engine a turning effect will be produced in the windings of the motor 307 and this effect will be produced soon after the slave engine begins to run at a speed different from the master engine. The phase will also change but initially cause only a relatively small motion of the motor 19. Thus a correcting movement will be given to the eccentric pivot 305 earlier than would be the case if the motor 19 alone were correcting the speed of the slave engine.

In other words although the system 307, 308, 309 is normally known as a speed synchronising system and is so designated in British Patent No. 515,934, it is in fact a phase conscious system and corrects for errors in phase in the manner described, but of course it has no datum seeking ability. This is supplied by the phase correcting motor 19.

The components of the electronic circuit shown in Figures 11A and 11B have the following values, characteristics or descriptions:

Fixed resistors:
Ref. No.—
- 111 _______________ 680K ohms, ¼ watt.
- 112 _______________ 680K ohms, ¼ watt.
- 113 _______________ 1 megohm, ¼ watt.
- 114 _______________ 1 megohm, ¼ watt.
- 119 _______________ 220K ohms, ¼ watt.
- 120 _______________ 220K ohms, ¼ watt.
- 125 _______________ 220K ohms, ¼ watt.
- 126 _______________ 220K ohms, ¼ watt.
- 134 _______________ 220K ohms, ¼ watt.
- 135 _______________ 220K ohms, ¼ watt.
- 138 _______________ 150K ohms, ¼ watt.
- 139 _______________ 150K ohms, ¼ watt.
- 141 _______________ 680K ohms, ¼ watt.
- 142 _______________ 680K ohms, ¼ watt.
- 148 _______________ 150K ohms, ¼ watt.
- 149 _______________ 150K ohms, ¼ watt.
- 152 _______________ 12K ohms, ¼ watt.
- 153 _______________ 680K ohms, ¼ watt.
- 154 _______________ 680K ohms, ¼ watt.
- 155 _______________ 1.2 megohms, ¼ watt.
- 156 _______________ 1.2 megohms, ¼ watt.
- 157 _______________ 1.5 megohms, ¼ watt.
- 158 _______________ 1.5 megohms, ¼ watt.
- 169 _______________ 220K ohms, ¼ watt.
- 170 _______________ 220K ohms, ¼ watt.
- 200 _______________ 22K ohms, ¼ watt.
- 178 _______________ 220K ohms, ¼ watt.
- 180 _______________ 220K ohms, ¼ watt.
- 181 _______________ 47K ohms, 1 watt.
- 182 _______________ 68K megohms, ½ watt.
- 183 _______________ 10 megohms, ¾ watt.
- 184 _______________ 10 megohms, ¾ watt.
- 188 and 187 ________ 33K ohms, ¼ watt.
- 190 _______________ 220K ohms, ½ watt.
- 191 _______________ 220K ohms, ½ watt.
- 203 _______________ 47K ohms, 1 watt.
- 204 _______________ 10K ohms, ½ watt.
- 205 _______________ 1.5M ohms, ½ watt.
- 251 _______________ 3.6K ohms, 1½ watt.
- 252 _______________ 3.6K ohms, 1½ watt.
- 208 _______________ 3.3K ohms, ¼ watt.
- 195 _______________ 1K ohms, ¼ watt.
- 196 _______________ 1K ohms, ¼ watt.

Variable Resistors:
- 179 _______________ 100K ohms, ¼ watt. (composition—linear).
- 189 _______________ 1K ohms, 1 watt (wire wound—linear).
- 255 _______________ 5K ohms, 2 watts. (wire wound—linear).
- 152 _______________ 22K ohms, 2 watts. (wire wound—linear).

Fixed capacitors:
- 109 _______________ 0.10µf., 350 volts.
- 110 _______________ 0.10µf., 350 volts.
- 127 _______________ 500pf., 600 volts.
- 128 _______________ 500pf., 600 volts.
- 129 _______________ 50pf., 600 volts.
- 162 _______________ 0.10µf., 350 volts.
- 163 _______________ 0.10µf., 350 volts.
- 164 _______________ 0.10µf., 350 volts.
- 165 _______________ 0.10µf., 350 volts.
- 195 _______________ 2µf., 150 volts.
- 196 _______________ 2µf., 150 volts.
- 241 _______________ 1µf., 350 volts.
- 242 _______________ 4µf., 350 volts.

Silicon rectifiers:

| | |
|---|---|
| 136 | RS22A or RS23A. |
| 137 | RS22A or RS23A. |
| 226 | ZR11. |
| 227 | ZR11. |
| 228 | ZR11. |
| 229 | ZR11. |
| 239 | IS113 (all four rectifiers). |

Valves:

| | |
|---|---|
| $V_1, V_2, V_3, V_4, V_5$ | 12 AX 7, CV 4004, 6057. |
| $V_6$ | 12 AT 7, CV 4024, 6060. |

Figure 7:
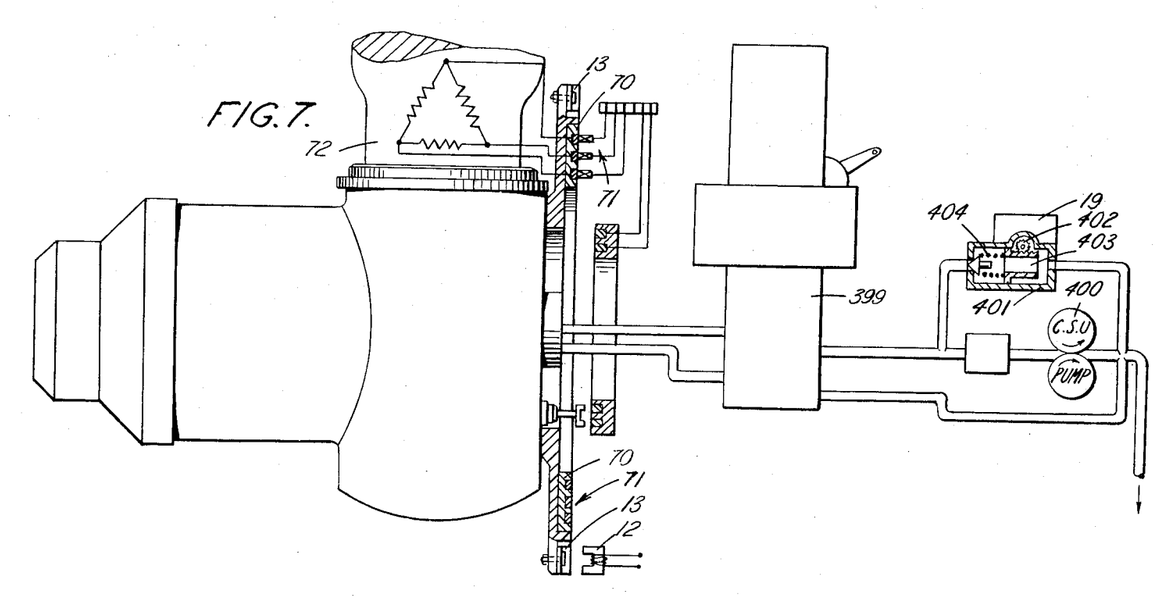
Figure 7 shows details of the mounting of some of the components of the apparatus.

The invention is not limited to the details of the foregoing embodiment described by way of example. For instance, in an alternative form of the invention as applied to a slave engine propeller unit of a multi-engined aircraft, in which the engine propeller unit comprises an hydraulic variable pitch propeller 72 (see Figure 7) having a constant speed unit 399 (which adjusts the speed by hydraulically altering the propeller pitch) including a fluid pump 400 driven by the engine and a relief valve 401 for the pump 400, the means for adjusting the difference in phase between the master and slave propeller units may comprise means operable by the motor 19 to adjust the setting of the said relief valve 401. With such an arrangement, variation of the relief valve blow-off pressure causes a change in the output of the pump 400 and causes, in consequence, a small variation in the power loading of the slave engine, which in turn effects a change in the phase relationship of the slave engine propeller with the master engine propeller. It must be understood that such small variation in power loading of the slave engine is insufficient to bring about a change in the pitch of the slave engine propeller. The means in such an arrangement are shown in Figure 7 and comprise a pinion 402, driven by the motor 19, and meshing with a toothed rack 403. The rack 403 is operable to adjust the compression of a spring 404, which sets the blow-off pressure of the relief valve 401. An alternative arrangement for assisting the adjustment of the phase difference between the master and slave propeller units is shown in Figure 2. A tacho-generator 70, shown by broken lines, is driven by the rotor of the motor 60. The tacho-generator provides a signal proportional to the rate of change of the phase difference error signal and the signal from the tacho-generator may be used to trim the main speed control linkage of the slave engine propeller unit by using it to control the motor 19.

The generator 25 may alternatively be an A.C. generator followed by a phase-discriminating rectifier circuit which may be incorporated in the amplifier 26.

Transistors or other semi-conducting devices may be employed instead of or in addition to thermionic tubes and the expression electronic device used herein includes all such devices.

We claim:

1. Apparatus for correcting any difference in speed, and automatically setting to a predetermined value the phase difference, between a master rotary member and a slave rotary member, comprising in combination a first dynamo electric machine, means energizing the said machine so that its rotor tends to rotate in a manner corresponding to the magnitude and sense of any difference between the speeds of the said rotary members, whereby the said first dynamo electric machine provides a first output, means for producing a master pulse of electrical energy each time the master rotary member occupies one or more predetermined angular master positions, means for producing a slave pulse of electrical energy each time the slave rotary member occupies one or more predetermined angular slave positions, there being a slave position corresponding to the, or each master position, means for comparing the succession of slave pulses with the succession of master pulses and producing an electrical phase difference error correcting signal which is directly proportional in magnitude, and corresponds in sense, to any error in the said phase difference, a second dynamo electric machine operated by the said signal at a rate proportional to the magnitude thereof and in a sense corresponding to the sense of the said signal, whereby the said second dynamo electric machine provides a second output, means combining the outputs of the two dynamo electric machines to provide a single correcting output, and means for adjusting the speed of the slave rotary member in accordance with the said correcting output.

2. Apparatus according to claim 1, wherein the said means for comparing the succession of slave pulses with the succession of master pulses and producing the said signal comprise an electronic device having two alternative stable states, which electronic device is changed from one state to the other and back again alternately by the master and slave pulses.

3. Apparatus according to claim 1, including an amplifier for amplifying the said signal, and wherein the said second dynamo electric machine comprises a reversible, two-phase A.C. motor, and the said amplifier applies to the said motor an alternating current, of a magnitude corresponding to the magnitude of the said error.

4. Apparatus according to claim 3, wherein the said means for adjusting the speed of the slave rotary member comprise a worm gear mounted on the output shaft of the said A.C. motor, which worm gear meshes with a pinion on which is eccentrically pivoted a link, one end of which is operably connected to a manual control and the other end of which is operably connected to a throttle valve controlling an engine driving the slave rotary member and to the datum control of a constant speed unit for the slave rotary member.

5. Apparatus according to claim 1, wherein the slave rotary member is the rotary part of an engine propeller unit.

6. Apparatus according to claim 5, wherein the master rotary member is the rotary part of an engine propeller unit.

7. Apparatus for correcting any difference in speed, and automatically setting to a predetermined value the phase difference, between a master rotary member and a slave rotary member, comprising in combination two alternators driven by the master rotary member and the slave rotary member respectively, a first dynamo electric machine having a rotor and two windings supplied with alternating current from the two alternators respectively, whereby the rotor of the machine tends to rotate in a manner corresponding to the vector difference between the electrical outputs of the said alternators, whereby the said first dynamo electric machine provides a first correcting output, means for producing a master pulse of electrical energy each time the master rotary member occupies one or more predetermined angular master positions, means for producing a slave pulse of electrical energy each time the slave rotary member occupies one or more predetermined angular slave positions, there being a slave position corresponding to the, or each, master position, means for comparing the succession of slave pulses with the succession of master pulses and producing an electrical phase difference error correcting signal which is directly proportional in magnitude, and corresponds in sense, to any error in the said phase difference, a second dynamo electric machine operated by the said signal at a rate proportional to the magnitude thereof and in a sense corresponding to the sense of the said signal, whereby the said second dynamo electric machine provides a second correcting output, means combining the outputs of the two dynamo electric machines to provide a single combined correcting output, and means for adjusting the speed of the slave rotary member in accordance with the said combined correcting output.

8. Apparatus for correcting any difference in speed, and automatically setting to a predetermined value the phase difference, between a master rotary member and a slave rotary member, comprising in combination two alternators driven by the master rotary member and the slave rotary member respectively, a first dynamo electric machine having a rotor and two windings supplied with alternating current from the two alternators respectively, whereby the rotor of the machine tends to rotate in a manner corresponding to the vector difference between the electrical outputs of the said alternators, whereby the said first dynamo electric machine provides a first correcting output, means for producing a master pulse of electrical energy each time the master rotary member occupies one or more predetermined angular master positions, means for producing a slave pulse of electrical energy each time the slave rotary member occupies one or more predetermined angular slave positions, there being a slave position corresponding to the, or each, master position, means for comparing the succession of slave pulses with the succession of master pulses and producing an electrical phase difference error correcting signal which is directly proportional in magnitude, and corresponds in sense, to any error in the said phase difference, a second dynamo electric machine operated by the said signal at a rate proportional to the magnitude thereof and in a sense corresponding to the sense of the said signal, whereby the said second dynamo electric machine provides a second correcting output, and means for adjusting the speed of the slave rotary member in accordance with both of the said correcting outputs.

9. Apparatus according to claim 8, including means for producing a rate of change of phase difference signal and means connecting said rate of change of phase difference signal to assist in reducing the phase difference error.

10. Apparatus according to claim 9, including means for producing a rate of change of phase difference error signal to assist in reducing the phase difference error.

11. Apparatus for correcting any difference in speed, and automatically setting to a predetermined value the phase difference, between a master rotary member and a slave rotary member, comprising in combination two alternators driven by the master rotary member and the slave rotary member respectively, a first dynamo electric machine having a rotor and two windings supplied with alternating current from the two alternators respectively, whereby the rotor of the machine tends to rotate in a manner corresponding to the vector difference between the electrical outputs of the said alternators, whereby the said first dynamo electric machine provides a first correcting output, means for producing a master pulse of electrical energy each time the master rotary member occupies one or more predetermined angular master positions, means for producing a slave pulse of electrical energy each time the slave rotary member occupies one or more predetermined angular slave positions, there being a slave position corresponding to the, or each, master position, means for comparing the succession of slave pulses with the succession of master pulses and producing an electrical phase difference error correcting signal which is directly proportional in magnitude, and corresponds in sense, to any error in the said phase difference, means for producing a rate of change of phase difference error signal, a second dynamo electric machine operated by the said signals at a rate proportional to the magnitude thereof and in a sense corresponding to the sense of the said signal, whereby the said second dynamo electric machine provides a second correcting output, means combining the outputs of the two dynamo electric machines to provide a single combined correcting output, and means for adjusting the speed of the slave rotary member in accordance with the said combined correcting output.

12. Apparatus according to claim 11, including means for producing a rate of change of rate of change of phase difference error signal connected to supplement the said signals.

References Cited in the file of this patent

UNITED STATES PATENTS 2,877,854 Brahm _______________ Mar. 17, 1959

OTHER REFERENCES

An Electronic Phasemeter, by Edwin F. Florman and Andrew Tait, "Proceedings of the I.R.E.," vol. 7, No. 2, February 1949; pages 207–210.